United States Patent [19]
Simonetti

[11] 3,817,141
[45] June 18, 1974

[54] ULTRASONICALLY DRIVEN CUTTING KNIFE AND METHOD AND APPARATUS FOR CUTTING A SOFT YIELDING BAKERY PRODUCT

[76] Inventor: Sergio G. Simonetti, 15 Adams Farm Rd., Westport, Conn. 06880

[22] Filed: Nov. 24, 1971

[21] Appl. No.: 201,833

[52] U.S. Cl. ............ 83/651, 51/59 SS, 74/1 SS, 83/433, 83/435, 83/701
[51] Int. Cl. ............................................. B26d 1/06
[58] Field of Search ......... 74/1 SS; 83/56, 651, 177, 83/575, 701, 529, 697, 42 J, 433; 51/59 SS

[56] References Cited
UNITED STATES PATENTS

| | | | |
|---|---|---|---|
| 2,632,858 | 3/1953 | Calosi | 74/1 SS |
| 2,990,616 | 7/1961 | Balamuth et al. | 51/59 SS X |
| 3,328,610 | 6/1967 | Jacke et al. | 259/1 R X |
| 3,561,462 | 2/1971 | Jugler | 51/59 SS |

*Primary Examiner*—Andrew R. Juhasz
*Assistant Examiner*—Leon Gilden
*Attorney, Agent, or Firm*—Cooper, Dunham, Clark, Griffin & Moran

[57] ABSTRACT

A cutting blade ultrasonically driven and constituting an acoustical impedance transformer which has a longitudinal cutting edge and a length which is substantially equal to an integral number of half wavelengths at the frequency at which the blade is driven. Method and apparatus for cutting a soft yielding bakery product involving ultrasonically vibrating the knife blade that is to cut the product.

6 Claims, 7 Drawing Figures

PATENTED JUN 18 1974　　　　　　　　　　　　　　　　　　　　3,817,141
Fig.1.     Fig.2.     Fig.3.
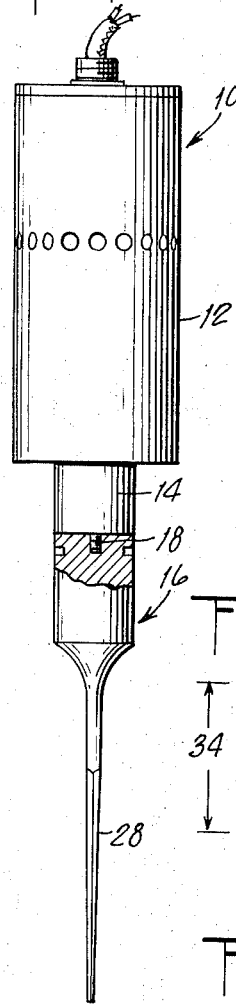
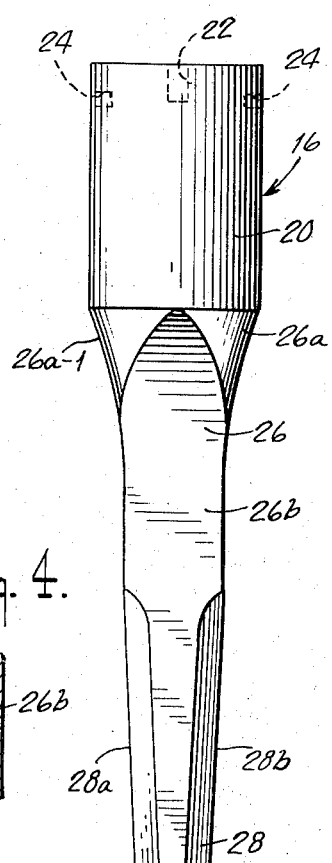
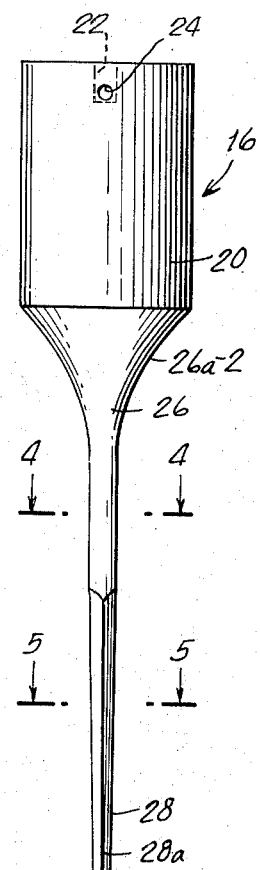
Fig.4.
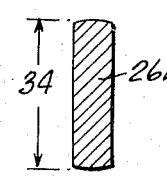
Fig.5.     Fig.6.
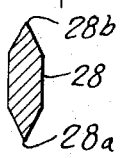     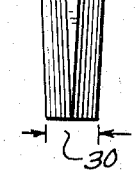
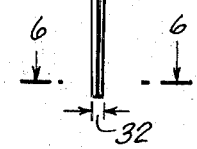
Fig.7.
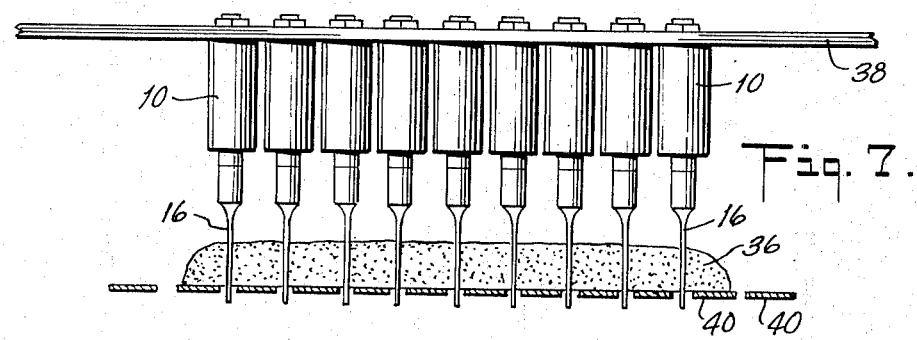

ULTRASONICALLY DRIVEN CUTTING KNIFE AND METHOD AND APPARATUS FOR CUTTING A SOFT YIELDING BAKERY PRODUCT

BACKGROUND AND BRIEF DESCRIPTION OF THE INVENTION

This invention relates to cutting instruments, and more particularly to an ultrasonically driven knife. The invention also relates to the cutting of soft yielding bakery products.

Difficulties have been encountered in the past in the cutting of bakery products, such as doughs and freshly baked breads and cakes. The present invention, therefore, is directed to an improved cutting of these products. It has been found that if a soft yielding bakery product cutting blade is ultrasonically vibrated during a cutting operation, the cutting operation is greatly improved. All soft yielding bakery products, including doughs and baked goods, may be cut without difficulty, i.e., without a shredding of the baked product or a sticking dough to the knife blade in the case of an unbaked product. The products can thus be cut at any stage of an operation, i.e., just after the making of the dough or just after the baking of bread, for example.

The present invention involves a knife blade that constitutes an acoustical impedance transformer. Such a transformer is normally employed in ultrasonic applications to transmit vibrations produced by an ultrasonic transducer to the tool that is driven. In the present invention, an accoustical impedance transformer itself constitutes the driven tool. The accoustical impedance transformer or so-called ultrasonic horn includes a cutting edge that extends in the longitudinal direction, so as to make a knife blade from the ultrasonic horn. The blade is advantageously an integral number of half wavelengths long at the frequency at which the blade is driven. In this fashion a standing wave pattern is established in the blade to enhance the cutting operation.

The following U.S. patents are representative of the prior art:

| Patentee | U.S. Pat. No. | Issue Date |
|---|---|---|
| Schneider | 1,970,397 | Aug. 14, 1934 |
| Vang | 2,714,890 | Aug. 9, 1955 |
| Armstrong | 2,753,470 | July 3, 1956 |
| Balamuth et al. | Re. 25,033 | Aug. 29, 1961 |
| Balamuth et al. | 3,086,288 | Apr. 23, 1963 |
| Jacke et al. | 3,328,610 | June 27, 1967 |
| Mead | 3,509,626 | May 5, 1970 |

The invention will be more completely understood by reference to the following detailed description.

BRIEF DESCRIPTION OF THE DRAWING

FIG. 1 shows a knife assembly in accordance with the invention.

FIG. 2 is an enlarged view of the knife blade shown in FIG. 1.

FIG. 3 is a view taken at 90 degrees to the view of FIG. 2.

FIGS. 4, 5 and 6 are sectional views of the knife blade shown in FIGS. 2 and 3, taken along the sections 4—4, 5—5 and 6—6 in FIG. 3.

FIG. 7 shows an array of cutting assemblies of the type shown in FIG. 1 mounted to cut a bakery product into a plurality of portions.

DETAILED DESCRIPTION

Referring to FIG. 1, a cutting assembly 10 is shown embodying the invention. The assembly includes a generating unit 12 which is the same as the sonic wave generator disclosed in the Jacke et al. U.S. Pat. No. 3,328,610, designated above in the list of prior art patents. The details of the generating unit 12 will not be explained here; reference is made to the Jacke et al. patent. The generator 12 may include a front resonating element or booster 14 to enhance the ultrasonic vibrations that are produced by the generator 12. Attached to the booster (or directly to the ultrasonic transducer — not shown — within the generator 12) is a blade 16, which may be threaded onto the end of the booster by a screw 18 that is attached to the booster.

Referring to FIGS. 2-6 which show the blade 16 in detail, the blade comprises a base section 20 which may be threaded as at 22 to receive the screw 18 at the end of the booster. The blade 16 should be firmly attached to the booster, and to this end a gasket or coupling wafer (not shown) may be employed to ensure good coupling. Holes 24 may be included in the base section 20 to receive a suitable tool (not shown) to aid in threading the blade onto the screw 18.

The base section 20 of the blade advantageously is circular in section, and its length in the longitudinal direction is substantially equal to an integral number (one or more) of quarter wavelengths at the frequency of vibration established by the generator 12. The base section 20 leads into an intermediate section 26, which advantageously is of a length substantially equal to an integral number (one or more) of quarter wavelengths at the frequency at which the blade is driven. The intermediate section 26 is tapered from the diameter of the section 20 to a final diameter in the section that is substantially rectangular, as shown by FIG. 4. Thus, the intermediate section 26 includes a tapered portion 26a and a non-tapered portion 26b.

The intermediate section 26 leads into a tip section 28, along which cutting edges 28a and 28b are located. The cutting edges 28a and 28b extend in the longitudinal direction and are typically formed by the grinding of the tip section 28 as any knife edge of a blade is formed. It will be noted from the sectional views of FIGS. 5 and 6 that the tip section 28 is tapered so as to become progressively thinner at sections more remote from the base section 20. The length of the tip section 28 is advantageously an integral number (one or more) of half wavelengths long at the frequency at which the blade is driven.

Thus, the over-all blade 16, comprised of base section 20, intermediate section 26 and tip section 28, is advantageously an integral number of half wavelengths long at the frequency at which the blade is driven, i.e., one half wavelength, one wavelength, one and one half wavelengths, two wavelengths, two and one half wavelengths, and so forth in length. By making the over-all blade 16 and the tip section 28 an integral number of half wavelengths long, a standing wave pattern is established in the blade to enhance the vibration of the blade in the ultrasonic range in turn to enhance the cutting action.

The blade 16 is typically driven at a frequency in the range of 20 to 22 kilohertz, and preferably at about 20 kilohertz, although the frequency may range from about 15 to about 60 kilohertz. At any particular driving frequency, the blade 16 may be "tuned" by observing the amplitude of vibration at the end of the tip section 28 and changing the length of the blade, e.g., by grinding away part of the tip section to achieve optimum amplitude of vibration. To this end the blade 16 may be made slightly longer than desired, and then ground during a tuning operation to a final blade length to achieve optimum vibration at that frequency. In this respect, the masses of the various blade sections affect the amplitude of vibration, and may be chosen to optimize that vibration. It has been found that a frequency of 20 to 22 kilohertz (preferably about 20 kilohertz) is preferable for the cutting of soft yielding bakery products, such as bread, with an amplitude of vibration of 0.003 to 0.010 inch. At amplitudes less than 0.003 inch, the cutting action of the blade with respect to the cutting of bread was found to drop off; at amplitudes greater than 0.010 inch there is a possibility that the limits of the blade material may be exceeded, resulting in blade damage, although the cutting action still may be satisfactory. In this respect, too short a blade may prevent tuning difficulties; too long a blade may flex to the point of breaking.

A cutting assembly as shown in FIG. 1 has been employed utilizing a titanium alloy blade 16 of titanium alloy type 7-4 (7 percent aluminum, 4 percent vanadium). Titanium alloys are believed to be preferable for the blade material, such as titanium alloys types 7-4 and 6-4 (6 percent aluminum, 4percent vanadium). Aluminum may provide a satisfactory blade material, although it may be somewhat more difficult to make a sharp edge. Steel, especially stainless steel, also should constitute good blade material. An over-all blade length of two wavelengths has been utilized at a frequency of about 20 kilohertz and utilizing titanium alloy type 7-4. The base section 20 was about 2-½ inches long, while the combined length of the base section 20 and the intermediate section 26 was about 5-⅜ inches. The over-all blade length from base section to the end of tip section 28 was about 11-⅞ inches, i.e., approximately 2 wavelengths long at a frequency of 20 kilohertz. The diameter of the base section 20 was about 1-¾ inches; the radii of the tapered sections 26a-1 and 26a-2 (see FIGS. 2 and 3) were respectively 8 inches and 2 inches. The dimensions 30 and 32 in FIGS. 2 and 3 were respectively one half inch and 0.08 to 0.09 inch. The dimension 34 in FIG. 4 was 1 inch.

The blade 16 just described constitutes an accoustical impedance transformer or ultrasonic horn. Such a transformer or horn is utilized in an ultrasonic system to convert mechanical vibrations from a transducer or booster, such as the booster 14 in FIG. 1, into the proper force-amplitude ratio for a particular application. As has been noted, accoustical impedance transformers have been employed in the past to transmit vibrations ultimately to a tool. In the present invention, the tool is comprised by the acoustical impedance transformer itself. This is a significant contribution in the art of ultrasonic cutting.

As noted, the cutting assembly 10 of FIG. 1 is suitable for cutting soft yielding bakery products, such as bread, cakes and similar baked goods as well as unbaked goods such as dough. An array of such cutting assemblies may be utilized as shown in FIG. 7 to cut a bakery product 36 into three or more portions. Nine of such cutting assemblies have been shown as mounted by a frame element 38, although this particular number of cutting assemblies is, of course, simply representative. The product 36 may be conveyed by a plurality of belts 40 between which are positioned the blades 16. The belts 40 convey the product 36 to the blades which are vibrated ultrasonically. The product 36 is severed into a number of portions as it is moved through the array of cutting assemblies.

A representative embodiment of the invention has been disclosed and described above. Modifications will occur to those skilled in the art. Accordingly, the invention should be taken to be defined by the following claims.

I claim:

1. A blade to be ultrasonically driven in the longitudinal direction, comprising an acoustical impedance transformer having a cutting edge extending in the longitudinal direction and of a length in the longitudinal direction substantially equal to an integral number of half wavelengths at the frequency at which the blade is to be driven, said blade being comprised of a base section to receive ultrasonic vibrations and of a length in the longitudinal direction substantially equal to an integral number of quarter wavelengths, an intermediate section at least partially tapered and of a length in the longitudinal direction substantially equal to an integral number of quarter wavelengths, and a tip section along which said cutting edge is located and of a length in the longitudinal direction substantially equal to an integral number of half wavelengths.

2. A blade according to claim 1, and which is about two wavelengths long.

3. A blade according to claim 1, which is made of titanium alloy or aluminum.

4. A blade according to claim 3, which is made of titanium 7-4 or 6-4 alloy.

5. A blade according to claim 1, which includes two cutting edges extending in the longitudinal direction.

6. A blade according to claim 1 in combination with an ultrasonic transducer for driving the blade at a frequency in the range of 20 to 22 kilohertz.

* * * * *